(No Model.)

M. D. TEMPLE.
CHAIN PUMP BUCKET.

No. 316,199. Patented Apr. 21, 1885.

Witnesses;
J. D. Clark
R. J. Huston

Inventor
Morris D. Temple,
per Wm Zimmerman
Attorney

UNITED STATES PATENT OFFICE.

MORRIS D. TEMPLE, OF CHICAGO, ILLINOIS.

CHAIN-PUMP BUCKET.

SPECIFICATION forming part of Letters Patent No. 316,199, dated April 21, 1885.

Application filed December 9, 1884. (No model.)

*To all whom it may concern:*

Be it known that I, MORRIS D. TEMPLE, a citizen of the United States, residing at Chicago, in the county of Cook and State of Illinois, have invented certain new and useful Improvements in Rubber Buckets for Chain-Pumps, which are fully set forth in the following specification, reference being had to the accompanying drawings, forming a part hereof, and in which—

Figure 1:
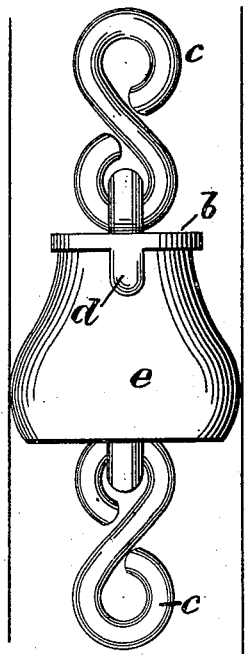
Figure 2:
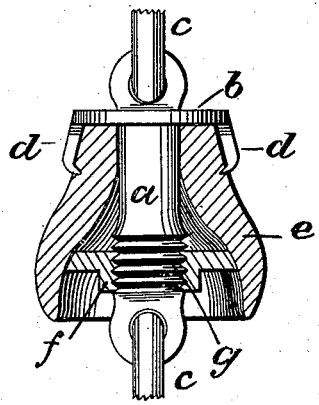
Figure 4:
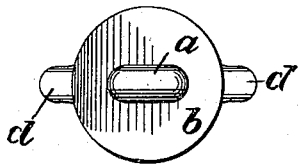
Figure 3:
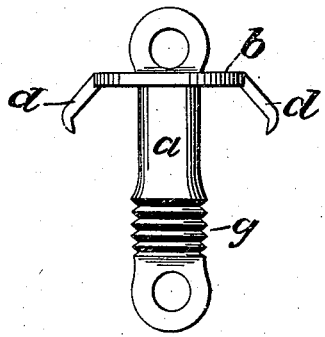

Figure 1 shows a side elevation of my bucket attached to a chain and within the bore of a tube. Fig. 2 is a central vertical section of the rubber of the bucket and nut $f$, the other parts being shown in full. Fig. 3 shows the spurs $d$ before they are bent down upon the rubber, as shown in Figs. 1 and 2. Fig. 4 is a plan view of the upper end of the bucket.

Like letters of reference indicate like parts.

The object of my invention is to provide better means to prevent the rubber from turning on the link, and thus through the friction of the rubber on the expanding nut change the position thereof.

Various contrivances have heretofore been in use for such purpose, but they are not fully effective, and also more expensive than my construction, which is as follows—viz:

The link $a$, with its thread $g$, nut $f$, and the flange or shoulder $b$, are constructed in the usual way, as are also the rubber $e$, chain $c$, &c.; but on the edge of the flange $b$ are formed lugs $d$, which, when of malleable iron, are cast at an angle about as shown in Fig. 3. Said lugs $d$ may also be formed from the link $a$ and the flange or shoulder be omitted, the lugs or arms so formed answering the purpose of a flange.

When the rubber $e$ is in its place, the lugs $d$ are bent down upon the rubber, as shown in Fig. 2, so as to press it hard, and thus prevent the rubber $e$ and link $a$ from turning on each other, and thereby, through the friction of the rubber on the nut $f$, change the position of it, and thereby alter the desired expansion of said rubber.

What I claim is—

1. In combination with the rubber $e$, the link $a$, provided with lugs or arms $d$, to be bent to press upon the rubber, substantially as specified.

2. In combination with a link $a$, having shoulder $b$, rubber $e$, and means to expand said rubber, the lug or lugs $d$, substantially as specified.

MORRIS D. TEMPLE.

Witnesses:
   WM. ZIMMERMAN,
   ROBT. J. HUSTON.